United States Patent
Ducore et al.

(10) Patent No.: US 12,154,002 B2
(45) Date of Patent: *Nov. 26, 2024

(54) QUANTUM HYBRID COMPUTATION

(71) Applicant: IonQ, Inc., College Park, MD (US)

(72) Inventors: Andrew Maps Ducore, Bethesda, MD (US); Matthew Joseph Keesan, Washington, DC (US); Yunseong Nam, North Bethesda, MD (US); Omar Shehab, Hyattsville, MD (US)

(73) Assignee: IonQ, Inc., College Park, MD (US)

( * ) Notice: Subject to any disclaimer, the term of this patent is extended or adjusted under 35 U.S.C. 154(b) by 504 days.

This patent is subject to a terminal disclaimer.

(21) Appl. No.: 17/389,483

(22) Filed: Jul. 30, 2021

(65) Prior Publication Data

US 2021/0357799 A1    Nov. 18, 2021

Related U.S. Application Data

(63) Continuation of application No. 16/038,484, filed on Jul. 18, 2018, now Pat. No. 11,087,232.

(51) Int. Cl.
*G06N 10/00* (2022.01)
*G06F 9/48* (2006.01)
*G06F 9/50* (2006.01)
*G06F 11/30* (2006.01)
*G06F 15/80* (2006.01)

(52) U.S. Cl.
CPC .......... *G06N 10/00* (2019.01); *G06F 9/4843* (2013.01); *G06F 9/5044* (2013.01); *G06F 11/3003* (2013.01); *G06F 15/80* (2013.01)

(58) Field of Classification Search
CPC .. G06F 9/4843; G06F 9/5044; G06F 11/3003; G06F 15/80
See application file for complete search history.

(56) References Cited

U.S. PATENT DOCUMENTS

| | | | |
|---|---|---|---|
| 7,035,906 | B1 | 4/2006 | Ellis, III |
| 9,660,859 | B1 | 5/2017 | Dadashikelayeh |

(Continued)

FOREIGN PATENT DOCUMENTS

| | | |
|---|---|---|
| JP | H10320214 A | 12/1998 |
| JP | 2006331249 A | 12/2006 |

(Continued)

OTHER PUBLICATIONS

Sarkar Aritra "Quantum Algorithms for Pattern-matching in Genomic Sequences" TU Delft Repository, Jun. 22, 2018, XP055854763, Delft, The Netherlands, pp. 3-16, Figs. 2.1-2.7, Chp 4, pp. 41-73, Figs. 4.1-4.17.

(Continued)

*Primary Examiner* — Jacob D Dascomb
(74) *Attorney, Agent, or Firm* — ARENTFOX SCHIFF LLP

(57) ABSTRACT

Technologies are described herein to implement quantum hybrid computations. Embodiments include receiving a hybrid program, assigning respective functions corresponding to the hybrid program to either of CPU processing or QPU processing, scheduling processing for the respective functions, initiating execution of the hybrid program, and collating results of the execution of the classical-quantum hybrid program.

20 Claims, 5 Drawing Sheets

(56) References Cited

U.S. PATENT DOCUMENTS

| | | | |
|---|---|---|---|
| 2008/0313430 A1 | 12/2008 | Bunyk | |
| 2009/0027402 A1 | 1/2009 | Bakalash et al. | |
| 2009/0199167 A1 | 8/2009 | Vorbach et al. | |
| 2011/0231510 A1 | 9/2011 | Korsunsky et al. | |
| 2014/0337612 A1 | 11/2014 | Williams | |
| 2017/0255629 A1* | 9/2017 | Thom | G06N 10/00 |
| 2017/0351974 A1 | 12/2017 | Rose | |
| 2017/0357539 A1 | 12/2017 | Dadashikelayeh et al. | |
| 2018/0260245 A1 | 9/2018 | Smith | |
| 2018/0365585 A1* | 12/2018 | Smith | G06N 10/00 |
| 2019/0080255 A1* | 3/2019 | Allen | G06N 10/00 |
| 2019/0102220 A1* | 4/2019 | Bishop | G06F 9/5072 |
| 2019/0258952 A1 | 8/2019 | Denchev | |
| 2019/0384597 A1 | 12/2019 | Horesh | |
| 2020/0065439 A1 | 2/2020 | Babbush | |
| 2020/0320424 A1 | 10/2020 | Yarkoni | |
| 2021/0357797 A1* | 11/2021 | Karalekas | G06N 10/80 |

FOREIGN PATENT DOCUMENTS

| | | | |
|---|---|---|---|
| JP | 2013114366 A | 6/2013 | |
| WO | 2017058194 A1 | 4/2017 | |

OTHER PUBLICATIONS

Extended Search Reported dated Apr. 4, 2022.
International Search Report dated Nov. 19, 2019.
Office Action in JP2021500534, drafted May 19, 2023, 4 pages.
Office Action in JP2021500534, mailed Nov. 14, 2023, 9 pages.
Anonymous, "Introduction of quantum programming using QISKit, operations, research," Japan Operations Research Society, Jan. 1, 2018, vol. 63, No. 6 (Gyo-Tsu No. 690), vol. 6, No. 6 (Gyo-Ke), pp. 42-48.

* cited by examiner

QUANTUM HYBRID COMPUTATION

CROSS-REFERENCE TO THE RELATED APPLICATION

The present application is a Continuation Application of application Ser. No. 16/038,484, filed Jul. 18, 2018, the contents of which are incorporated herein by reference.

TECHNICAL FIELD

The embodiments described herein pertain generally to implementing efficient execution of quantum circuits built by classical processes.

BACKGROUND

A quantum computer is a computational system which uses quantum-mechanical phenomena, such as superposition and entanglement, to process data. Unlike digital computers, in which data is encoded into binary digits (bits) in one of two definite states ("0" or "1"), quantum computation requires data to be encoded into quantum bits (hereafter "qubits"), for which a single qubit may represent a "1," a "0," or any quantum superposition of the two qubit states. In general, a quantum computer with N qubits may be in an arbitrary superposition of up to $2^N$ different states simultaneously, i.e., a pair of qubits may be in any quantum superposition of four states, and three qubits may be in any superposition of eight states.

Large-scale quantum computers are able to solve certain problems much more quickly than digital computers (alternatively referred to herein as "classical computers"). In the operation of a quantum computer, computations may be initialized by setting qubits in a controlled initial state. By manipulating those qubits, predetermined sequences of quantum logic gates are realized that represent the problem to be solved, called a quantum algorithm. Quantum algorithms, such as Shor's algorithm, Simon's algorithm, etc., run faster than any possible probabilistic classical algorithm. Quantum algorithms are often non-deterministic, as they provide a correct solution only with a certain known probability.

Based on the inherent advantages in quantum computers in solving certain problems, the challenge is in programming quantum computers to take advantage of their strengths.

SUMMARY

In one example embodiment, a method to implement quantum hybrid computation includes receiving a hybrid program, assigning respective functions corresponding to the hybrid program to either of classical information processing or quantum information processing, scheduling processing for the respective functions, initiating execution of the hybrid program, transferring partial results of functions between classical processors and quantum processors, and collating results of the execution of the hybrid program.

In another example embodiment, an apparatus to implement quantum hybrid computation includes a receiver to receive a hybrid program; an arbiter to assign respective functions to either of classical information processing or quantum information processing, based on one or more criteria for the respective functions; a scheduler to schedule processing of the respective functions on both classical processors and quantum processors; and a manager to transfer partial results of the functions between the classical processors and the quantum processors and to collate results of the processing.

In yet another embodiment, a computer-readable medium stores instructions that, upon execution, cause a digital computing processor to receive a hybrid program having one or more executable components written in a first language and one or more executable components written in a second language; assign executable components written in the first language for execution in a first computing environment; assign executable components written in the second language for execution in a second computing environment; schedule execution in the first computing environment relative to execution in the second computing environment; collate results of the scheduled execution; iteratively repeat the scheduled execution based on the collated results of a most recent iteration of the execution; and terminate the iterative repetitions of the execution upon occurrence of a predetermined milestone.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
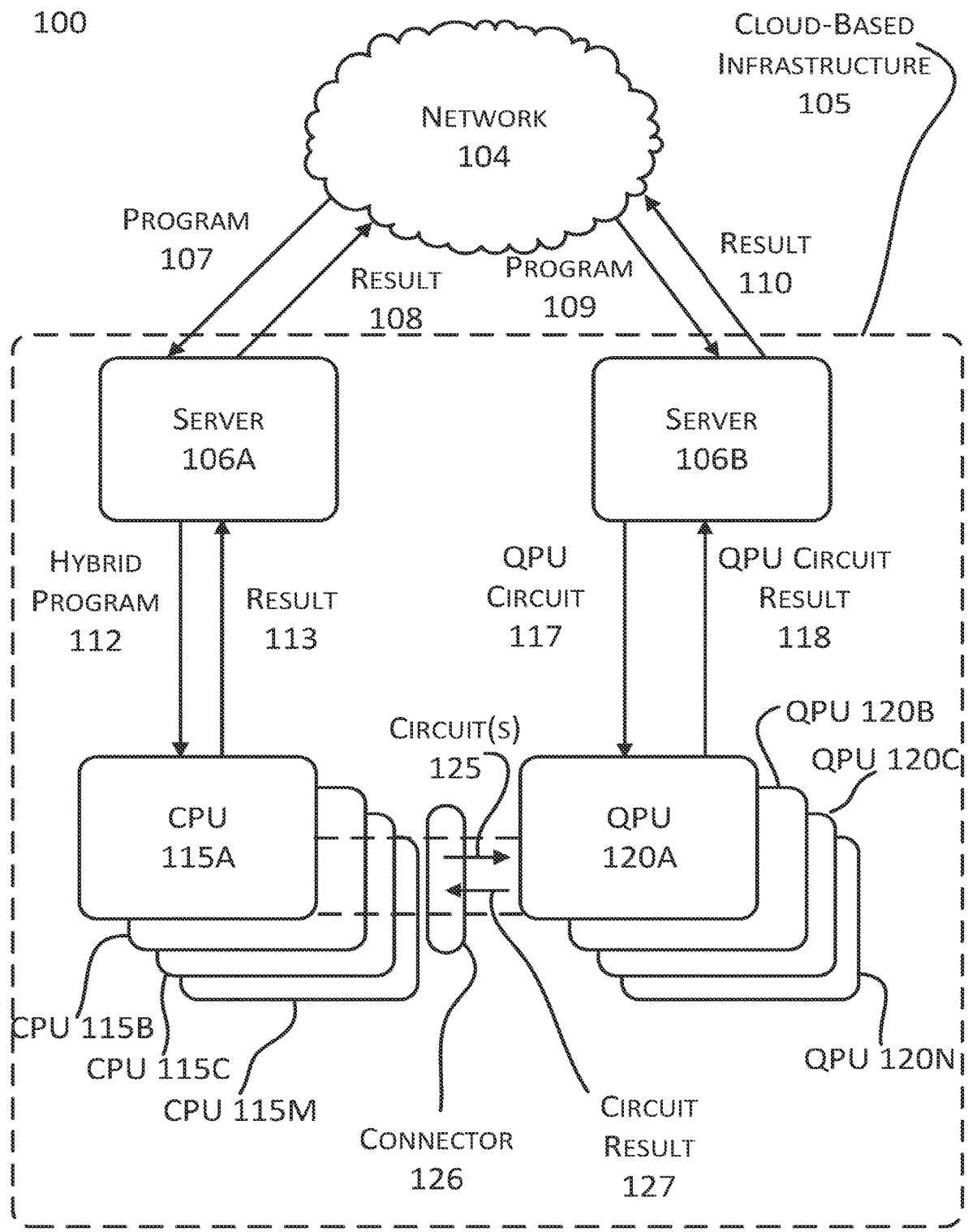
FIG. 1 shows an example system configuration in which quantum hybrid computations may be implemented, arranged in accordance with at least some embodiments described herein.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

Described herein are approaches embodied in one or more of systems, apparatuses, applications, programs, and methods by which quantum hybrid computation including both classical and quantum computing are securely and efficiently implemented by, e.g., apportioning computing between co-located computing devices in disparate computing environments.

In the present description, the following terms may be used, in addition to their accepted meaning, as follows:

"Classical computing," "classical program," "digital computing," "digital program," or variations thereof may refer to computing/processing of data that has been converted into binary numbers. Classical computing processors may include, but not be limited to, a central processing unit (CPU), a graphical processing unit (GPU), a tensor processing unit (TPU), application-specific integrated circuits (ASICs), field programmable gate arrays, etc., and unbound permutations thereof. Non-limiting examples thereof may include a classical optimization function that may be parallelized and run on a multicore classical computer; a classical computer with a GPU for performing parallel calculations, etc.

"Quantum computing," or variations thereof, may refer to computing/processing of data that has been encoded into qubits. Quantum computing utilizes atoms to perform high-level gating functions to produce results on the order of 10K faster than classical computing.

"Environment" may refer to a computing environment in which are found components that when executing program may utilize, e.g., utilities such as libraries, other programs, other hardware, etc. Thus, reference may be made herein to a classical computing environment, a quantum computing environment, etc.

"Hybrid program" may refer to a quantum program, which is an iterative process, that is programmed in a classical computing environment, with at least some functions thereof intended for execution in a quantum computing environment, e.g., a quantum sandbox. Results of executed functions corresponding to the hybrid program may be measured or collated in a classical computing environment, in which the quantum program, or iterative process, is then updated or replaced. Such processing may be iteratively repeated on the order of hundreds of thousands of times until the processing reaches a time- or -processing-based milestone.

A "circuit" may refer to quantum function included in a hybrid program, owing to the linear nature of the processing of such a function.

A "sandbox" may refer to a restricted environment in which certain functions are prohibited. In the current context, a sandbox may be used to isolate one running function from another, whether the running function is a classical computation or a quantum computation, particularly when any of the running functions are received from a third party and its trust level is not entirely verified.

In accordance with the example embodiments described herein, quantum computing includes executing iterative processes by which a quantum circuit may be written in a classical computing environment for execution in a quantum computing environment. Non-limiting examples of such classical computing environment that can be used include a desktop computer, a laptop computer, mobile device, etc. The quantum circuit may be submitted via a network, e.g., the Internet, to a quantum computing device at which the quantum circuit may be queued with other quantum circuits, in the same manner as, for example, batch processing for a mainframe computing device. The queued quantum circuits may be executed in turn.

Iterative, or cumulative, results of the computing of the quantum circuit may be received and collated in either the classical computing environment in which the quantum circuit was written or in a different classical computing environment in which the execution of the quantum circuit is managed. Whichever classical computing environment, the quantum circuit may be updated or rewritten based upon results of the most recent iteration or upon cumulative results of the computing up to that point.

When a quantum circuit written in the classical computing environment is submitted over the Internet for processing by, for example, a cloud-based quantum computing device, both submission of the circuit as well as results thereof may be slowed due to network latency and bandwidth consumption. Consequently, resource cost can be expected to be significant for such computing scenarios. This approach is problematic for optimization problems, e.g., quantum chemistry, which entail a two-part algorithm by which a quantum state is set up via a quantum computer and the result is optimized on a classical computer, particularly since quantum optimization requires iterations on the order of tens or even hundreds of thousands. That is, the network-based exchange of the volumes of data inherent with quantum computing may be considered to be prohibitive and slow to practitioners.

FIG. 1 shows an example system configuration 100 in which quantum hybrid computations may be implemented, arranged in accordance with at least some embodiments described herein. As depicted, configuration 100 includes at least a network 104, cloud-based infrastructure 105, servers 106A and 106B, classical processing units 115A-115M, quantum processing units 120A-120N, and connector 126.

Network 104, by which one or more users are able to submit program 107 and/or program 109 for execution may refer to a network configured to support at least the transmission of programs from a user or user entity to cloud-based infrastructure 105. In accordance with some examples, network 104 may include the Internet to provide communication between multiple network terminals. Thus, network 104 may support real time communication data streams between a user terminal, e.g., a classical computing device, and cloud-based infrastructure 105.

Cloud-based infrastructure 105 may refer to a service provider datacenter having multiple servers, including servers 106A and 106B; and computing devices, including classical computing devices CPU 115A-115M and quantum computing devices 120A-120N. It should be noted that the computing devices may be implemented by single or multiple machines. Further, cloud-based infrastructure 105 may be operated for a single organization. Non-limiting examples of such organizations that operate, manage, and/or host such an infrastructure may include, but not be limited to, Amazon®, Microsoft®, Google®, IBM®, etc.

Servers 106A and 106B may refer to two of multiple, on the order of hundreds to thousands, servers hosted on cloud-based infrastructure 105 that are configured to receive, at least, programs 107 and 109 from a user or user entity via network 104. Servers 106A and 106B may be further configured to receive and/or store partial or complete results 108 and 110 of the execution of programs 107 and 109, respectively, and return such results to the user or user entity, also via network 104. Neither of servers 106A and 106B is limited to receiving only hybrid programs, classical programs, or quantum programs. Therefore, unless otherwise stated herein, there should be no distinction between the types of programs that may be received at or transmitted from either of servers 106A and 106B. Further, unless context otherwise requires, reference hereafter may be made to server 106, which may imply reference to either of servers 106A and 106B, without departing from the spirit or scope of the embodiments of quantum hybrid computations described herein. It should also be noted that the servers 106A and 106B may be implemented by single or multiple machines and the programs 107 and 109 can be submitted to servers 106A and 106B across single or multiple connections or channels. That is, in accordance with at least one example embodiment, servers 106A and 106B may be implemented as a single server and perform at least all functions described herein as being attributed to either server.

Program 107 may refer to one or more programs received from a user or user entity, via network 104, and/or stored by server 106. Program 107 may include one or more executable components or functions written in a first language intended for execution in a first computing environment and one or more executable components or functions written in a second language intended for execution in a second computing environment. The first language may be a classical computing programming language, and the second language may be a quantum computing language, e.g., Python.

More particularly, program 107 may refer to one or more programs received from a user or user entity, via network 104, and/or stored by server 106. Program 107 may include one or more classical computing programs and/or one or more hybrid programs 112. A classical computing program may be written in a classical programming language, and will not be described herein.

Hybrid program 112, typically written or programmed in a classical environment, may include one or more classical components or functions as well as one or more quantum circuits 125. A classical component or function may be distinguished from a quantum circuit based on features that are inherently associated with either of the respective computing environments, such as, but not limited to, functions, language, libraries, etc. For example, program 107 may be written or programmed using a Python software development kit (SDK), and include instructions to execute one or more quantum scientific calculations. Thus, server 106A may identify received program 107 to be a hybrid program when received program 107 includes classical computing components or functions, and/or is written in a classical computing language; and includes quantum computing functions, and/or is written in a quantum computing language. The SDKs referenced herein are not limited to any particular quantum language.

Results 108 may refer to iterative or cumulative results from the execution of one or more classical computing programs executed on one or more of CPU 115A-115M. In addition, or alternatively, results 108 may include results 113 from the execution of hybrid program 112 on one or more of CPU 115A-115M and one or more of QPU 120A-120N. Further still, results 113 may include iterative or cumulative results of execution of hybrid program 112. Results 108 may be stored on server 106 and/or returned to the user or user entity via network 104.

Program 109 may refer to one or more programs received from a user or user entity, via network 104, and/or stored by server 106. Program 109 may include at least one or more QPU circuits 117 written or programmed in a classical environment intended for execution in a quantum computing environment. Thus, QPU circuits 117, included among programs 109, may be written or programmed entirely in a quantum computing language or include only quantum circuits.

Results 110 may refer to iterative or cumulative results from the execution of QPU circuits 117, included in program 109, executed on one or more of QPU 120A-120N. Results 110 may be stored on server 106 and/or returned to the user or user entity via network 104.

Classical computing devices CPU 115A-115M may refer to one or more embodiments of a classical computing environment that includes a classical computer, processing device, and/or even individual processors, on which hybrid program 112 is at least managed, and on which at least portions of the results thereof are measured or collated.

CPU 115A-115M may receive hybrid program 112 into a hybrid job queue, which is memory or storage components or devices included in or otherwise associated with one or more embodiments of CPU 115; manage hybrid program 112, including assigning execution of one or more classical components or functions to any one or more of CPU 115A-115M; assigning execution of one or more of quantum circuits 125 to any one or more of QPU 120A-120N; scheduling processing for the classical components or functions as well as circuits 125 on the assigned processing devices; initiating execution of the classical components or functions as well as circuits 125; and collating iterative and/or cumulative results of hybrid program 112, including results 113 of the respective classical components or functions and results 127 of the quantum circuits 125.

CPU 115A-115M may iteratively manage processing of hybrid program 112 on the order of hundreds of thousands of times until a processing and/or time milestone is reached. General examples of such milestones may pertain to a predetermined number of iterations, a time limit for iterative computing, a predetermined threshold difference between results of successive iterations, etc.

Further, although CPU 115M denotes no restriction upon the number of CPU in any embodiment of quantum hybrid computations, unless context otherwise requires, reference hereafter may be made CPU 115 without departing from the spirit or scope of the embodiments of quantum hybrid computations described herein. Further still, although reference herein is made to CPU, within the context of quantum hybrid computations, the embodiments of classical computing processors may also or alternatively include, but not be limited to, a central processing unit (CPU), a graphical processing unit (GPU), a tensor processing unit (TPU), etc.

Quantum computing devices 120A-120N may refer to multiple embodiments of a quantum computing environment that includes a quantum computer, processing device, and/or even individual processors, on which QPU circuits 117 and quantum circuits 125 may be executed. As set forth prior, CPU 115A-115M may manage processing of hybrid program 112. In that regard, quantum computing devices 120A-120N each has a classical computing interface to orchestrate processing on the respective quantum device.

Further, although QPU 120 N denotes no restriction upon the number of QPU in any embodiment of quantum hybrid computations, unless context otherwise requires, reference hereafter may be made QPU 120 without departing from the spirit or scope of the embodiments of quantum hybrid computations described herein.

Connector 126 may connect various permutations of CPU 115 and QPU 120. Connector 126 may be embodied as a hardware connection or by a high-speed Ethernet connection on the order of, at least, 100 GB. Regardless, an implementation of connector 126 is to minimize latency and/or lag between any one of CPU 115 and QPU 120. Thus, in accordance with at least some embodiments of quantum hybrid computation, CPU 115 and QPU 120 may be physically co-located, i.e., physically connected by connector 126 in a datacenter corresponding to cloud-based infrastructure 105 or in a single structural unit, e.g., housing, substrate, apparatus.

Connector 126, though, may not be regarded as a simple connector or a simple design choice. When switching between processing on CPU 115 and QPU 120, minimizing delay becomes paramount due to the short period of time that coherence is maintained in a qubit system. Thus, much of the hybrid program 112 is executed as closely to QPU 120 as possible. Also, because of the likely large quantities of classical data to be produced by the CPU 115 and QPU 120 in the course of executing hybrid program 112, the cost of shuttling information from therebetween increases as the physical and systemic separation of the processors increases.

However, alternative embodiments may contemplate CPU 115 and QPU 120 being virtually connected by connector 126, in accordance with developing technologies to minimize latency and/or lag resulting from the transfer of significant volumes and iterations of data transfer.

Quantities of servers 106, CPU 115, and QPU 115 hosted on or otherwise associated with cloud-based infrastructure 105 may vary from one embodiment to another, without departing from the spirit or scope of quantum hybrid computations, as described herein. Thus, CPU 115M and QPU 120N may or may not be equal in quantity in any embodiment of quantum hybrid computations.

Figure 2:
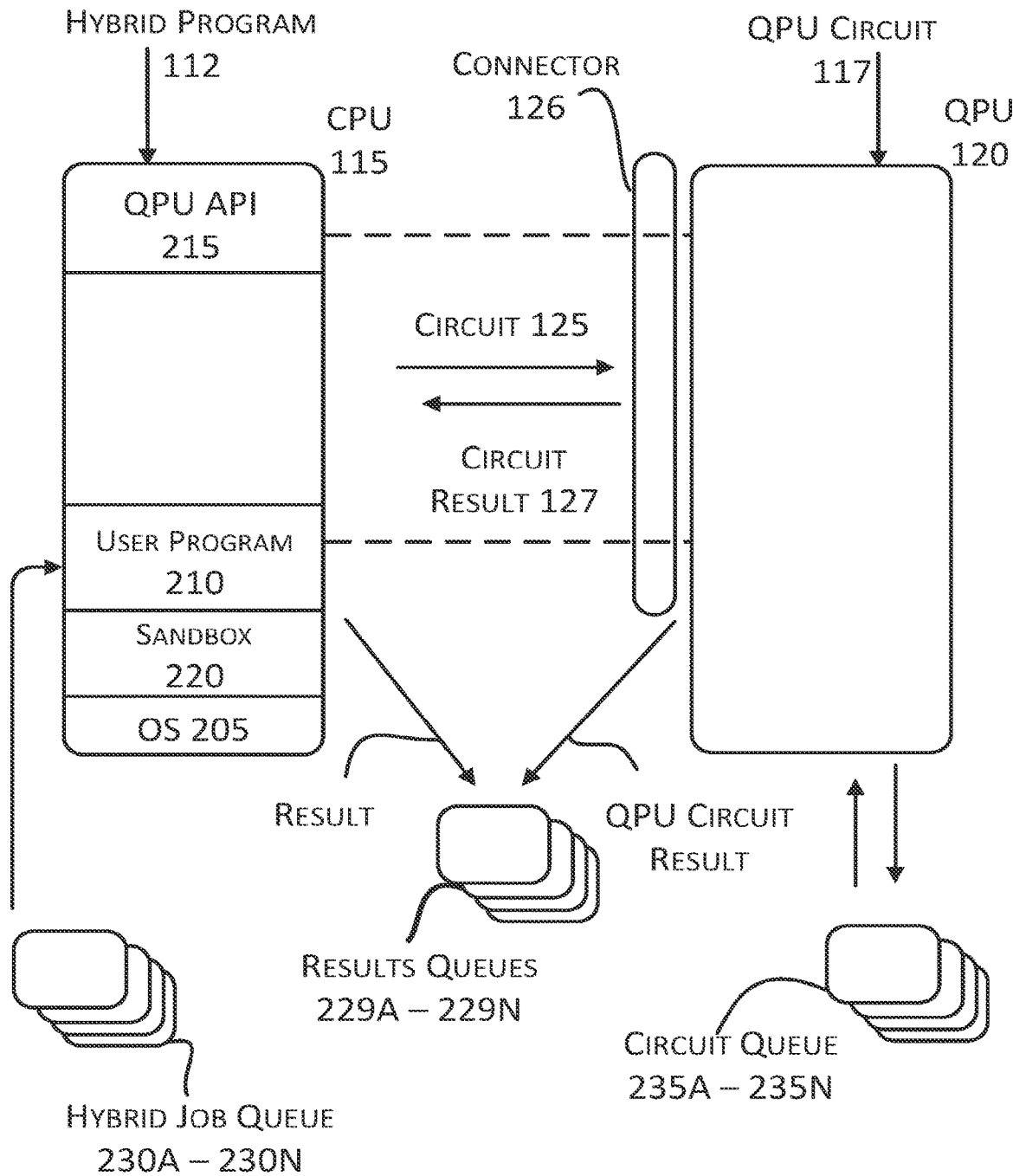
FIG. 2 shows an example configuration of a system of processors by which quantum hybrid computations may be implemented, arranged in accordance with at least some embodiments described herein.

FIG. 2 shows an example configuration of a system 200 of processors by which quantum hybrid computations may be implemented, arranged in accordance with at least some embodiments described herein. As depicted, system 200 includes at least CPU 115, QPU 120, connector 126, results queues 229, hybrid jobs queues 230, and quantum circuit queues 235.

CPU 115 may refer to one or more embodiments of a classical computing environment that includes a classical computer, processing device, and/or even individual processors, as described herein regarding FIG. 1. As depicted, CPU 115 includes, at least, operating system (OS) 205, user program 210, QPU API 215, and execution sandbox 220.

OS 205 may refer to a classical computing operating system that is designed, programmed, or otherwise configured to control classical computing software and hardware components. Thus, in accordance with at least some embodiments of quantum hybrid processing, OS 205 may be designed, programmed, or otherwise configured to receive hybrid program 112, assign execution of one or more classical components or functions to any one or more of CPU 115; schedule and/or prioritize processing for the classical components or functions as well as circuits 125; assign one or more of quantum circuits 125 to any one or more of hybrid job queues 130-130N, for ultimate execution on QPU 120; initiate execution of hybrid program 112; and collate iterative and/or cumulative results of hybrid program 112.

Hybrid job queue 230A-230N may refer to memory or storage components or devices included in or otherwise associated with one or more embodiments of CPU 115. Because quantum circuits are linear, quantum circuits included in hybrid program 112 may be queued, in the same manner as batch processing. Thus, hybrid job queues 230A-230N may be designed, programmed, or otherwise configured to store quantum circuits 125 for scheduled or prioritized execution on one or more assigned embodiments of QPU 120.

User program 210 may refer to a program that is designed, programmed, or otherwise configured to execute the classical components or functions corresponding to hybrid program 112. Results of such execution may be iteratively or cumulatively transmitted or submitted to one or more of results queue 229A-229N.

Execution sandbox 220, utilizing QPU API (application programming interface) 215, may transmit or submit quantum circuits 125 to the assigned one of QPU 120, in accordance with the scheduling and prioritization enacted by OS 205. Thus, execution sandbox 220 may be isolated in its interaction with QPU 120, as circuits 125 are transmitted or submitted and as results 127 are received. Results 127 from execution of circuits 125 may be iteratively or cumulatively transmitted or submitted to results queue 229A-229N.

Execution sandbox 220 may also be designed, programmed, or otherwise configured to update or replace circuit 125 based on iterative results of execution on QPU 120, and then transmit or submit the updated or new circuit to QPU 120 for continued iterative processing.

Further still, a separate instance of execution sandbox 215 is utilized for each circuit 125, thus facilitating execution of multiple circuits in parallel.

Such computing of hybrid program 112 may continue for iterations on the order of hundreds of thousands of times until a processing and/or time milestone is reached. Non-limiting examples of such milestones may pertain to a predetermined number of iterations, a time limit for iterative computing, a predetermined threshold difference between results of successive iterations, etc.

Results queue 229A-229N may be memory or storage components or devices included in or otherwise associated with one or more embodiments of CPU 115. Results queues 229A-229N may be designed, programmed, or otherwise configured to store iterative and cumulative results of execution of hybrid program 112, including the execution of the corresponding classical components or functions and quantum circuits.

Quantum circuits may be executed in isolation. Thus, when an embodiment of QPU 120 receives QPU circuit 117 but is unable to execute the received circuit, QPU circuit 117 may be assigned to one or more of circuit queues 235A-235N.

Circuit queue 235A-235N may refer to memory or storage components or devices included in or otherwise associated with one or more embodiments of QPU 120. Circuit queues 235A-235N may be designed, programmed, or otherwise configured to store QPU circuits 117 for scheduled or prioritized execution on an embodiment of QPU 120. QPU 120 may be shut off from circuit queues 235A-235N, i.e., unable to execute any of QPU circuits 117, when QPU 120 is needed to perform quantum processing for circuit 125 associated with hybrid program 112. Thus, QPU circuits 117 stored in any of circuit queues 235A-235N may be assigned to an embodiment of QPU 120 that is not assigned any circuit 125 corresponding to hybrid program 112.

Figure 3:
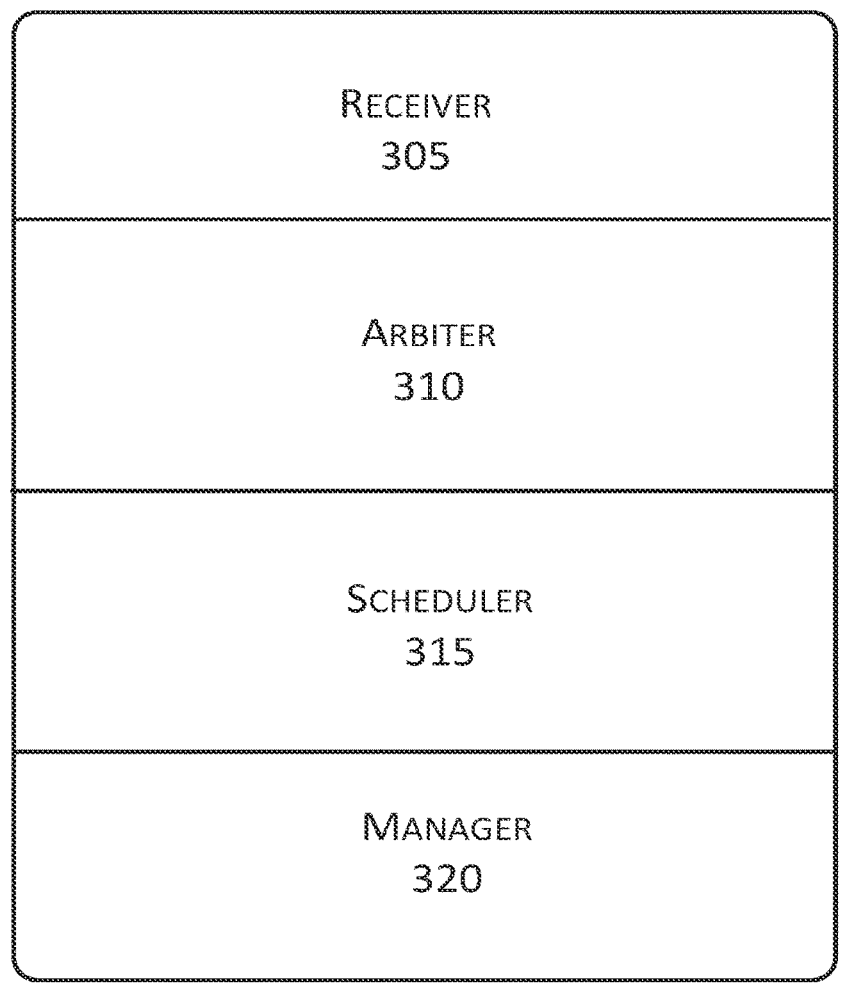
FIG. 3 shows an example block-diagram configuration of a processor for facilitating at least portions of quantum hybrid computations, arranged in accordance with at least some embodiments described herein.

FIG. 3 shows an example block-diagram configuration of a processor 300 for facilitating at least portions of quantum hybrid computations, arranged in accordance with at least some embodiments described herein. As depicted, processor 300 may correspond to any one of CPU 115 described herein regarding systems 100 and 200; further, processor 300 includes, at least, receiver 305, arbiter 310, scheduler 315, and manager 320.

Receiver 305 may refer to a component or module that is designed, programmed, or otherwise configured to receive, at least, a hybrid program from a user or user entity via a network, e.g., the Internet. A hybrid program may refer to a quantum program or iterative process that is programmed in a classical computing environment, with at least some functions thereof intended for execution in a quantum computing environment.

Arbiter 310 may refer to a component or module that is designed, programmed, or otherwise configured to assign execution of one or more classical components or functions corresponding to the received hybrid program to one or more classical processing devices and assign execution of one or more of quantum circuits to any one or more quantum processing devices. Arbiter 310 may assign a function, as referenced above, based on one or plural features of the function that are inherently associated with either of classical processing or quantum processing. Such features may be known in the art, and therefore are not described herein. Further, if a function is capable of being executed by more than one processor in either of a classical computing environment or a quantum computing environment, arbiter 310 may assign the function to a respective processor based on heuristics and a characterized performance profile of the processor.

Scheduler 315 may refer to a component or module that is designed, programmed, or otherwise configured to schedule processing for the classical components or functions as well as circuits processing assigned by arbiter 310. As part of the scheduling, scheduler 315 may prioritize execution of the respective functions in both the classical computing environment and the quantum computing environment. Scheduler 315 may prioritize the scheduling for optimization purposes, as well as based on dependencies between functions, i.e., parallelization.

Manager 320 may refer to a component or module that is designed, programmed, or otherwise configured to manage execution of the received hybrid program. For example, manager 320 may initiate execution of the classical components or functions as well as quantum circuits corresponding to the hybrid program; transfer partial results of the execution of functions between processors in the classical computing environment and the quantum computing environment, with the transfer being in either direction as appropriate for execution; and collate iterative and/or cumulative results of the hybrid program for iterations on the order of hundreds of thousands until a processing and/or time milestone is reached. Non-limiting examples of such milestones may pertain to a predetermined number of iterations, a time limit for iterative computing, a predetermined threshold difference between results of successive iterations, etc.

As part of managing execution of hybrid program 112, manager 320 may be designed, programmed, or otherwise configured to execute instructions to switch processing from CPU 115 to QPU 120 and vice-versa, in accordance with commands in the source code of hybrid program 112, e.g., an instruction to execute circuit 120 on a specified one of QPU 120. The instructions to change processors, within either computing environment, may be used by any software libraries or SDKs that the respective environment exposes to hybrid application 120, or the instructions may be inserted programmatically by the respective computing environment when it is determined that a more suitable processor should be used, e.g., a command to switch to another device, inserted by the complier of a domain-specific-language.

Figure 4:
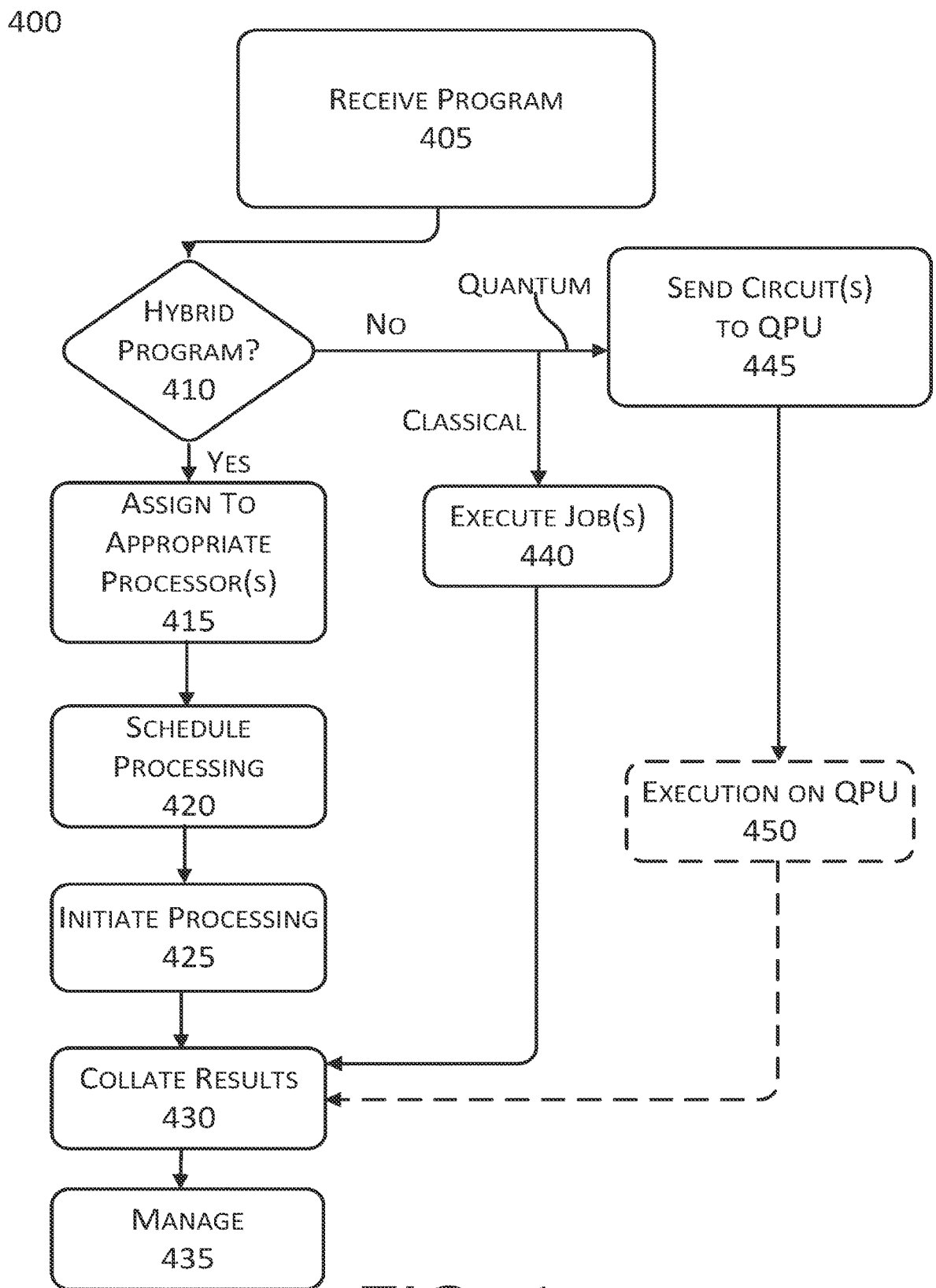
FIG. 4 shows an example processing flow by which at least portions of classical/hybrid computations are implemented, in accordance with at least some embodiments described herein.

FIG. 4 shows an example processing flow 400 by which at least portions of hybrid computations are implemented, in accordance with at least some embodiments described herein. As depicted, processing flow 400 includes sub-processes executed by various components of processor 300 that are included in systems 100 and 200 hosted on cloud-based infrastructure 105. However, processing flow 400 is not limited to such components, as obvious modifications may be made by re-ordering two or more of the sub-processes described here, eliminating at least one of the sub-processes, adding further sub-processes, substituting components, or even having various components assuming sub-processing roles accorded to other components in the following description. Processing flow 400 may include various operations, functions, or actions as illustrated by one or more of blocks 405, 404, 410, 415, 420, 425, 430, 435, 440, 445, and/or 450. These various operations, functions, or actions may, for example, correspond to software, program code or program instructions executable by a processor that causes the functions to be performed. Processing may begin at block 405.

At block 405 (Receive Program), server 106 may receive a hybrid program from a user or user entity via network 104. Processing may proceed to decision block 410.

At decision block 410 (Hybrid Program?), server 106 may determine whether the received program is a hybrid program. The determination may be made based on various criteria, e.g., the received program includes classical computing components or functions and/or is written in a classical computing language and, further, includes quantum computing functions and/or is written in a quantum computing language. Server 106 may distinguish a classical component or function from a quantum circuit based on features that are inherently associated with either of the respective computing environments, such as, but not limited to, functions, language, libraries, etc. For example, program 107 may be written or programmed using a python software development kit (SDK), and include instructions to execute one or more quantum scientific calculations; thus, server 106 may determine that received program 107 is a hybrid program, in accordance with examples described herein.

If received program 107 is not a hybrid program (NO), but rather is a classical computing program, i.e., server 106 detects that the received program 107 only contains classical computing components, processing may proceed to block 440. If the received program is a hybrid program (YES), processing may proceed to block 415.

At block 440 (Execute Job(s)), the classical computing program may be executed on one or more embodiments of CPU 115, and the results may be collated at block 430.

If the received program is not a hybrid program (NO), but rather is a quantum computing program, i.e., server 106 detects that the received program 109 only contains quantum circuits, processing may proceed to block 445.

At block 445 (Send Circuit(s) to QPU), the quantum circuits may be sent directly to one of QPU 120 for processing or to one of circuit queues 235A-235N to await processing, with execution occurring at block 450. The results of such processing may be collated at block 430.

At block 415 (Assign to Appropriate Processor), arbiter 310 may assign execution of one or more classical components or functions to any one or more of CPU 115 and assign execution of one or more of the quantum circuits associated with the hybrid circuit to any one or more of QPU 120. Processing may proceed to block 420.

At block 420 (Schedule Processing), scheduler 315 may schedule processing for the classical components or functions as well as the quantum circuits associated with the hybrid circuit on the processing devices assigned at block 415. The scheduling may be a prioritization of processing based on any criteria that may be written into the hybrid program, to optimize processing, to facilitate parallelization among executed processes and/or circuits, resource allocation, etc. Processing may proceed to block 425.

At block 425 (Initiate Processing), manager 320 may initiate execution of the classical components or functions as well as the circuits associated with the hybrid program, based on the scheduling or prioritization at block 410. Such execution may include sending quantum circuits to one of QPU 120 for processing or to one of circuit queues 235A-235N to await processing. Processing flow 400 may proceed to block 430.

At block 430 (Collate Results), manager 320 may collate iterative and/or cumulative results of hybrid program 112, including results of the respective classical components or functions and results of the quantum circuits corresponding to the hybrid program. That is, in accordance with at least one known example of iterative processing, an initiated hybrid program includes the execution of classical code to generate a quantum circuit, producing a corresponding result. Multiple iterations of such processing are executed until completion. Processing may proceed to block 435.

At block 435 (Manage), manager 320 may further iteratively manage processing of the hybrid program on the order of hundreds of thousands of times until a processing and/or time milestone is reached. Examples of such milestones may pertain to a predetermined number of iterations, a time limit for iterative computing, a predetermined threshold difference between results of successive iterations, etc. Thus, management may additionally include updating or replacing an executed quantum circuit corresponding to the hybrid program based on either of the iterative or cumulative results of an earlier iteration. Processing may proceed or terminate based on whether an appropriate milestone has been reached.

Figure 5:
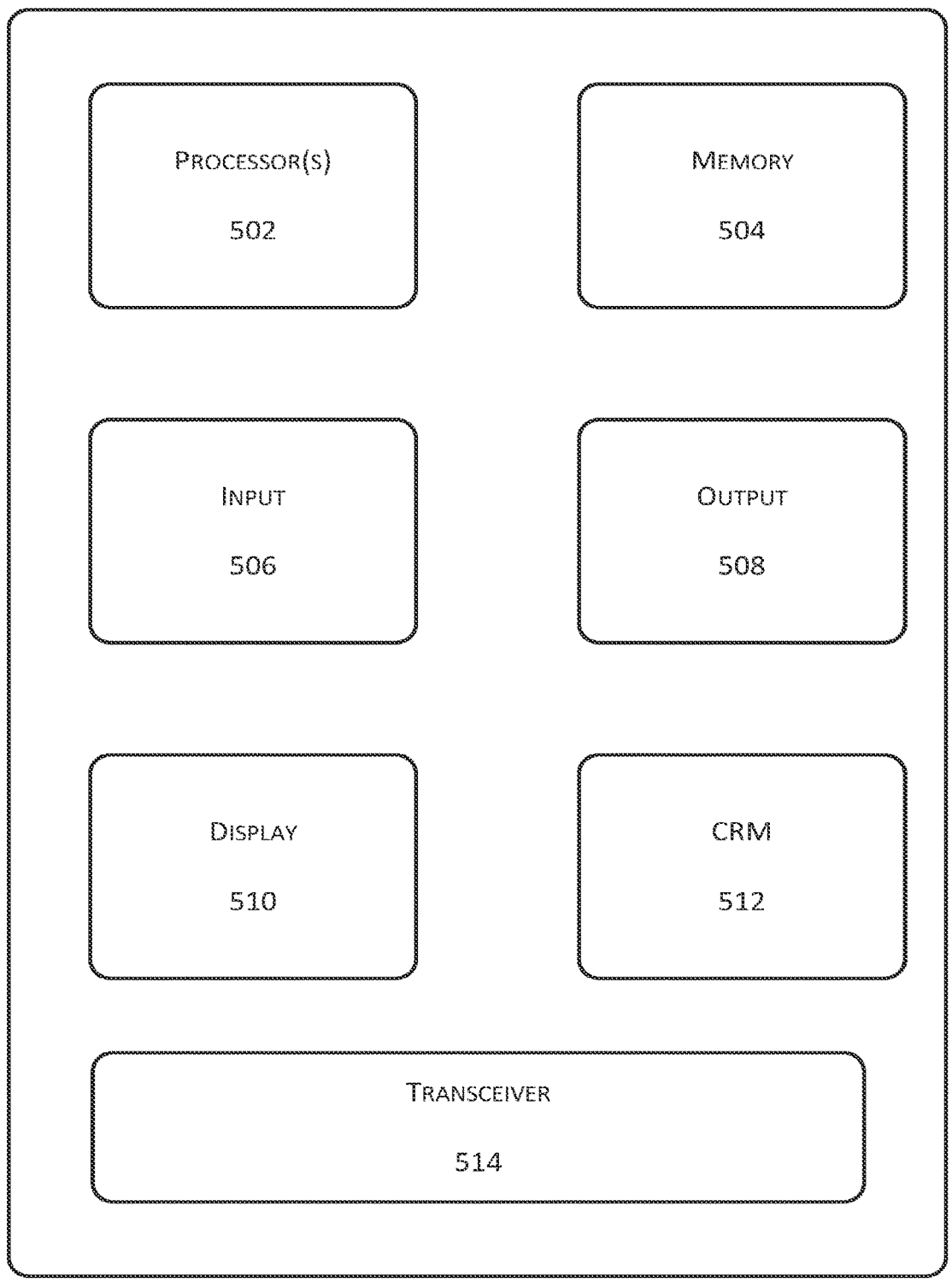
FIG. 5 shows an illustrative computing embodiment, in which any of the processes and sub-processes of quantum hybrid computation may be implemented as computer-readable instructions stored on a computer-readable medium.

FIG. 5 shows an illustrative computing embodiment, in which any of the processes and sub-processes of quantum hybrid computation may be implemented as computer-readable instructions stored on a computer-readable medium. The computer-readable instructions may, for example, be executed by a processor of a device, as referenced herein, having a network element and/or any other device corresponding thereto, particularly as applicable to the applications and/or programs described above corresponding to systems 100 and 200 for quantum hybrid computation.

In a very basic configuration, a computing device 500 may typically include, at least, one or more processors 502, a system memory 504, one or more input components 506, one or more output components 508, a display component 510, a computer-readable medium 512, and a transceiver 514.

Processor 502 may refer to, e.g., a microprocessor, a microcontroller, a digital signal processor, or any combination thereof.

Memory 504 may refer to, e.g., a volatile memory, non-volatile memory, or any combination thereof. Memory 504 may store, therein, operating system 205, an application, and/or program data. That is, memory 504 may store executable instructions to implement any of the functions or operations described above and, therefore, memory 504 may be regarded as a computer-readable medium.

Input component 506 may refer to a built-in or communicatively coupled keyboard, touch screen, or telecommunication device. Alternatively, input component 506 may include a microphone that is configured, in cooperation with a voice-recognition program that may be stored in memory 504, to receive voice commands from a user of computing device 500. Further, input component 506, if not built-in to computing device 500, may be communicatively coupled thereto via short-range communication protocols including, but not limitation, radio frequency or Bluetooth.

Output component 508 may refer to a component or module, built-in or removable from computing device 500, that is configured to output commands and data to an external device.

Display component 510 may refer to, e.g., a solid state display that may have touch input capabilities. That is, display component 510 may include capabilities that may be shared with or replace those of input component 506.

Computer-readable medium 512 may refer to a separable machine readable medium that is configured to store one or more programs that embody any of the functions or operations described above. That is, computer-readable medium 512, which may be received into or otherwise connected to a drive component of computing device 500, may store executable instructions to implement any of the functions or operations described above. These instructions may be complimentary or otherwise independent of those stored by memory 504.

Transceiver 514 may refer to a network communication link for computing device 500, configured as a wired network or direct-wired connection. Alternatively, transceiver 514 may be configured as a wireless connection, e.g., radio frequency (RF), infrared, Bluetooth, and other wireless protocols.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method comprising:
receiving, at a cloud-based infrastructure having a classical computing environment with one or more classical processors and a quantum computing environment with one or more quantum processors, a program with multiple computing functions;
determining whether the program is a classical computing program that only includes classical computing functions, a quantum computing program that only includes quantum computing functions, or a hybrid program that includes both classical computing functions and quantum computing functions, wherein a first determination that the program is a classical computing program comprises determining that the program is written in a classical computing language and a second determination that the program is a quantum computing program comprises determining that the program is written in a quantum computing language; and in response to a determination that the program is a hybrid program:

assigning respective classical computing functions corresponding to the hybrid program identified for execution in the classical computing environment and respective quantum computing functions corresponding to the hybrid program identified for execution in the quantum computing environment;

scheduling processing for the respective classical computing functions and quantum computing functions corresponding to the hybrid program;

initiating execution of the hybrid program;

transferring partial results during execution of the hybrid program between the one or more classical processors and the one or more quantum processors; and collating results of the execution of the hybrid program.

2. The method of claim 1, wherein the assigning is based on one or more features for the respective computing functions that are inherently associated with either of classical information processing or quantum information processing.

3. The method of claim 1, wherein the assigning is based on computing functions identified with at least one of a library of classical computing functions and a library of quantum computing functions.

4. The method of claim 1, wherein the assigning is based on heuristics and a characterized performance profile of at least one of the one or more classical processors and at least one of the one or more quantum processors.

5. The method of claim 1, wherein the scheduling includes prioritizing of the respective computing functions for both classical information processing and quantum information processing.

6. The method of claim 5, wherein the scheduling is based on quantum optimization.

7. The method of claim 5, wherein the scheduling is based on data dependencies between the computing functions.

8. The method of claim 5, wherein the initiating is based on results of the prioritizing.

9. An apparatus, comprising:

a receiver unit comprising circuitry configured to cause the apparatus to receive a hybrid program with multiple computing functions comprising classical computing functions identified for execution in a classical computing environment with one or more classical processors and quantum computing functions identified for execution in a quantum computing environment with one or more quantum processors;

an arbiter unit comprising circuitry configured to:

determine, based on the multiple computing functions, whether the program is a classical computing program that only includes classical computing functions, a quantum computing program that only includes quantum computing functions, or a hybrid program that includes both classical computing functions and quantum computing functions, wherein a first determination that the program is a classical computing program comprises determining that the program is written in a classical computing language and a second determination that the program is a quantum computing program comprises determining that the program is written in a quantum computing language; and in response to a determination that the program is a hybrid program: cause the apparatus to assign respective computing functions to either of the classical computing environment or the quantum computing environment;

a scheduler unit comprising circuitry configured to cause the apparatus to schedule processing of the respective computing functions on either of the one or more classical processors or the one or more quantum processors, as assigned by the arbiter; and a manager unit comprising circuitry configured to cause the apparatus to:

transfer partial results of the scheduled processing between the one or more classical processors and the one or more quantum processors, collate results of the processing on the one or more classical processors and the one or more quantum processors.

10. The apparatus of claim 9, wherein the arbiter unit assigns respective computing functions based on criteria that includes assigning computing functions identified with at least one of a library of classical computing functions and a library of quantum computing functions.

11. The apparatus of claim 9, wherein the arbiter unit assigns respective computing functions based on criteria including heuristics and a characterized performance profile of at least one of the one or more classical processors and at least one of the one or more quantum processors.

12. The apparatus of claim 9, wherein the arbiter unit assigns respective computing functions based on criteria including known processing requirements for any one of the respective computing functions.

13. A non-transitory computer-readable medium storing executable instructions that, upon execution, cause a digital computing processor to perform functions comprising:

receiving, at a cloud-based infrastructure having a classical computing environment with one or more classical processors and a quantum computing environment with one or more quantum processors, a program with multiple computing functions comprising at least one classical computing function and at least one quantum computing function;

determining, based on the multiple computing functions, whether the program is a classical computing program that only includes classical computing functions, a quantum computing program that only includes quantum computing functions, or a hybrid program that includes both classical computing functions and quantum computing functions, wherein a first determination that the program is a classical computing program comprises determining that the program is written in a classical computing language and a second determination that the program is a quantum computing program comprises determining that the program is written in a quantum computing language; and in response to a determination that the program is a hybrid program:

assigning the at least one classical computing function identified for execution in the classical computing environment comprising classical information processing logic;

assigning the at least one quantum computing function identified for execution in the quantum computing environment comprising quantum information processing logic;

scheduling execution in the classical computing environment relative to execution in the quantum computing environment; and collating results of the scheduled execution.

14. The computer-readable medium of claim 13,
wherein the assigning the at least one classical computing function identified for execution in the classical computing environment includes assigning computing functions identified with a library of classical computing functions, and
wherein the assigning the at least one quantum computing function identified for execution in the quantum computing environment includes assigning computing functions identified with a library of quantum computing functions.

15. The computer-readable medium of claim 13, wherein the assigning of the at least one classical computing function includes assigning execution of the at least one classical computing function to a respective one of the classical processors.

16. The computer-readable medium of claim 13, wherein the program with multiple computing functions comprises at least two classical computing functions and the assigned classical computing functions are executed in parallel on multiple ones of the classical processors.

17. The computer-readable medium of claim 13, wherein the assigning of the at least one quantum computing function includes assigning execution of the at least one quantum computing function to a respective one of the quantum processors.

18. The computer-readable medium of claim 13, wherein the program with multiple computing functions comprises at least two quantum computing functions and the assigning of quantum computing functions is executed in parallel on multiple ones of the quantum processors.

19. The computer-readable medium of claim 13, wherein the scheduling execution is further time-based.

20. The computer-readable medium of claim 13, wherein the scheduling execution is further based on resource usage in either of the classical computing environment or the quantum computing environment.

* * * * *